United States Patent [19]
Davis et al.

[11] Patent Number: 4,886,941
[45] Date of Patent: Dec. 12, 1989

[54] CIRCUIT FOR INTERFACING MOUSE INPUT DEVICE TO COMPUTER SYSTEM

[75] Inventors: Hedley Davis, Middletown, Del.; Robert Raible, West Chester, Pa.

[73] Assignee: Commodore Business Machines, Inc., West Chester, Pa.

[21] Appl. No.: 51,451

[22] Filed: May 19, 1987

[51] Int. Cl.⁴ ............................................. G08C 21/00
[52] U.S. Cl. ........................................ 178/18; 340/710
[58] Field of Search .................... 178/18, 19; 340/709, 340/710; 382/3, 13, 59; 250/231 SE

[56] References Cited
U.S. PATENT DOCUMENTS
4,739,303. 4/1988 Kobayashi ..................... 178/18 X Primary Examiner—Stafford D. Schreyer
Attorney, Agent, or Firm—Finnegan, Henderson, Farabow, Garrett & Dunner

[57] ABSTRACT

A computer system mouse-type input device. Movements of a track-ball motion sensor are converted to quadrature signals and are accumulated in a counting circuit. The contents of the counter are pulse-position modulated with waveforms characteristic of a resistive-capacitive charging circuit and are read periodically by a computer input channel normally used for input of potentiometer-generated commands. The pulse-position modulated signals are converted to digital values used by the computer to position the cursor on a display screen.

8 Claims, 15 Drawing Sheets

CIRCUIT FOR INTERFACING MOUSE INPUT DEVICE TO COMPUTER SYSTEM

BACKGROUND OF THE INVENTION

I. Field of the Invention

This invention relates to mouse input devices for computer systems and, more particularly, to an improved method and apparatus for interfacing a mouse input device to a computer system by using an input channel designed for accepting potentiometer derived inputs.

II. Background Information

Low cost personal computers intended for use by beginning or unsophisticated computer users are commonly designed to employ the so-called "mouse-icon" user interface graphics. This type of user interface system allows the computer operator to select programs and generate input commands without knowledge or memorization of any special input command codes and sequences. The user simply calls up various graphic screen presentations containing instructional information and symbols called "icons." By using a two dimensional motion sensor such as a mouse track ball input device, the operator positions a cursor on the screen to selected icon symbols and operates one or more buttons on the mouse device to signal program selections or to otherwise generate computer input commands.

The computer system controls the screen position of the cursor based on movement commands generated through use of the mouse. The operator moves the mouse along a flat surface in order to rotate a track ball within the mouse casing, whereupon X and Y input commands are generated and supplied to the computer. The computer converts the mouse input commands into X and Y position signals and locates the cursor on the screen accordingly.

Low cost personal computer systems are generally designed to utilize a number of different types of input devices. For example, "joystick" input devices are frequently provided to enable the user to execute video game programs. The computer system usually is equipped with special interface devices to enable signals produced by a joystick controller and other specialized types of input devices to be converted into signals processable by the computer. Another common type of user input device supplied with a personal computer system is the so-called "paddle" controller. This type of device employs one or more slide-type potentiometers which are operated either by linear or rotational user actuated controls.

It is an object of the present invention to provide an improved method and apparatus for connecting a mouse-type input device to a computer system.

Another object is to provide an interfacing circuit of the type described which allows a mouse-type input device to be interfaced to the system via an existing, standard input channel designed for another type of input device.

Still a further object is to provide a circuit for interfacing a mouse-type input device to a computer system using an input channel designed for receiving potentiometer-generated input commands.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects and in accordance with a principle of the invention, a mouse-type input device is provided for connection to a computer having a timing means for generating a succession of time cycles and a sensing means for sensing the time of occurrence of a predetermined voltage during each of the time cycles, the input device comprising a motion sensor means responsive to the travel of the input device operative to generate a succession of electrical signals having characteristics corresponding to the distance and direction of travel of the input device; an interface means responsive to the succession of electrical signals for generating during each of the succession of time cycles a first pulse of predetermined voltage having a time of occurrence in a respective time cycle corresponding to the characteristics of the electrical signals; and coupling means for receiving the succession of time cycles and for transmitting the succession of first pulses.

The accompanying drawings, which are incorporated in and constitute a part of the specification, illustrate preferred embodiments of the invention and, together with the general description given above and the detailed description of the preferred embodiments given below, serve to explain the principles of the invention.

DESCRIPTION OF THE PREFERRED EMBODIMENT

Reference will now be made in detail to the present preferred embodiment of the invention as illustrated in the accompanying drawings.

Figure 1:
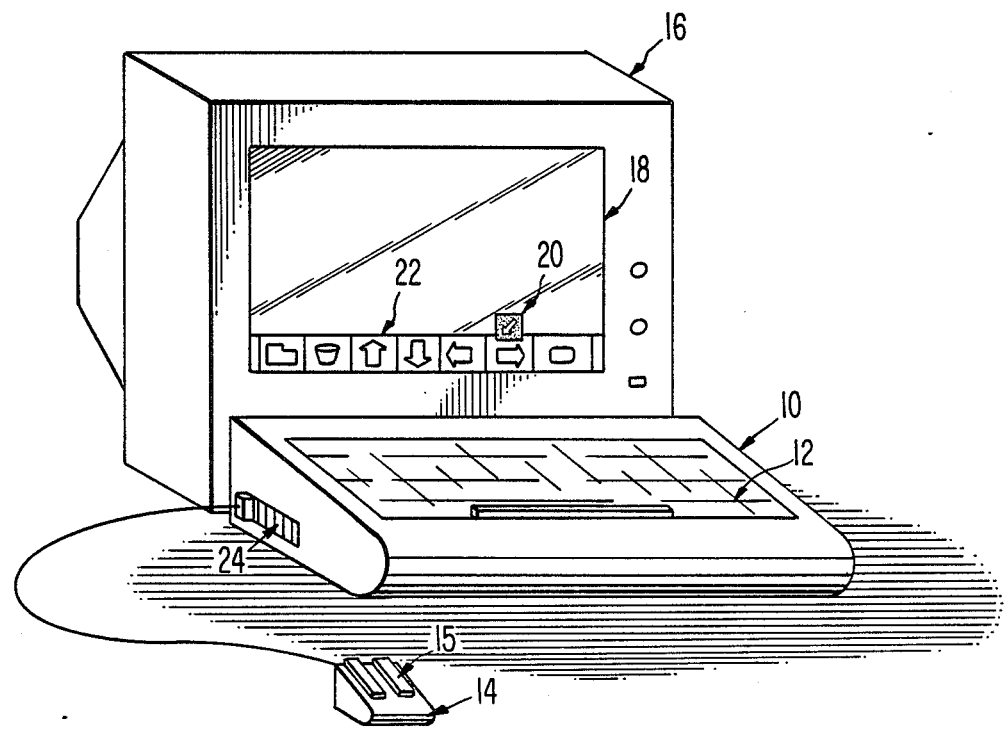
FIG. 1 is a schematic diagram depicting a personal computing system having a mouse-type input device.

As shown in FIG. 1, a known type of personal computer system includes control and CPU unit 10 including a keyboard panel 12. Display unit 16 is cable-connected to the CPU 10 and includes a display screen 18 on which is displayed a cursor 20 and various menu areas and icon symbols 22. To generate computer input commands the operator moves mouse 14 along the flat surface on which the computer rests in order to guide the cursor 20 to the appropriate location on the screen. When the cursor is properly positioned, the operator depresses one of the mouse buttons 15 to signal the desired input command.

CPU 10 is provided with a plug panel 24 for connecting various input devices to the system, such as a joystick, or with the benefit of the present invention, a mouse 14. The system may, for example, be a Commodore C64 or C128 system, incorporating an integrated circuit called a SID (sound interface device) adapted to convert potentiometer driver input commands from devices such as a paddle actuator into inputs which are recognizable to the system as particular input commands. Potentiometer-generated inputs from paddle devices are coupled to the SID chip by "POT X" and a "POT Y" lines. Each of these lines is driven identically by the SID chip to allow two single slope A–D conversions to be performed simultaneously on the signals present on the POT lines. The SID circuit, when operating in normal mode for reading potentiometer commands, grounds the POT input lines for 256 ticks of a 512 tick clock cycle, which is controlled by the CPU timing. The paddle input devices include a variable resistor connected to the POT line and to a reference voltage. A 1,000 PF capacitor is connected to each POT line and to ground. The SID circuit allows the capacitor to charge during the second half of the sampling cycle at a rate which is proportional to the potentiometer setting. The SID circuit has an internal counter which is enabled between the time that the SID circuit releases the POT line and the time when the charging waveform exceeds some threshold voltage level. The SID counter counts the time that it takes the capacitor to charge from ground to the threshold level and thus enters a digital input to a register normally available to the CPU indicative of the potentiometer input command signal.

The mouse interface circuit of the invention cooperates with the SID circuit to supply an input which looks to the system like a normal capacitor charging interval for reading a potentiometer command. This circuit is shown schematically in FIG. 2.

Figure 2:
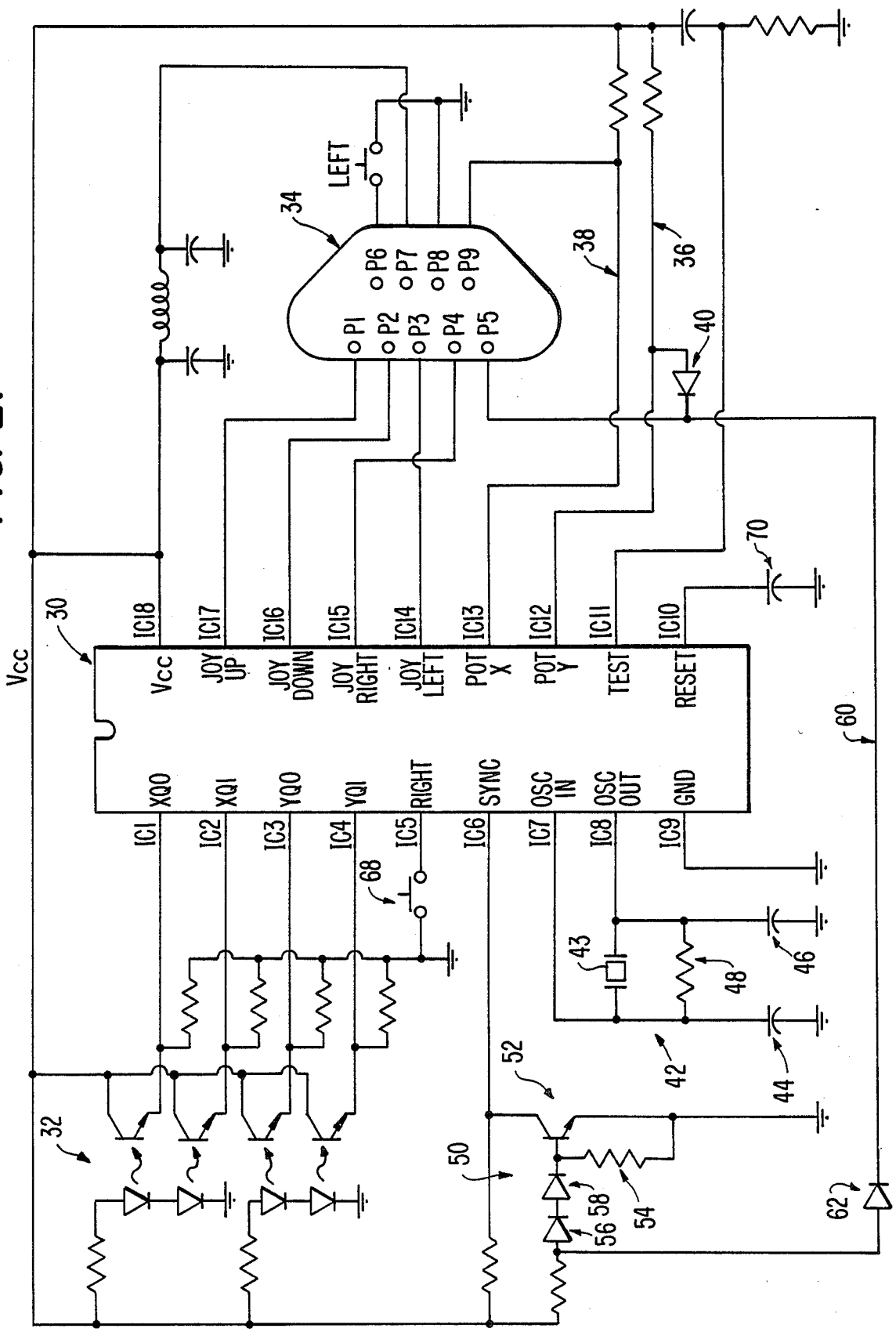
FIG. 2 is an electrical schematic diagram showing a first preferred embodiment of the interface circuit of the invention.

Referring to FIG. 2, an integrated circuit chip 30 in a "DIP" package is provided with 18 I/O pins, IC1 to IC18. The circuit of FIG. 2 may be packaged in the same case as the mouse device 14. Pins IC1–IC4 of the chip 30 receive the quadrature input signals XQ0, XQ1, YQ0 and YQ1 supplied by the conventional optical track ball read out circuits 32 in response to components of mouse movement in orthogonal X and Y directions. The SID circuit plug 34 provided in plug panel 24 on the CPU 10 (FIG. 1) has nine pins, P1 to P9 as shown in FIG. 2. Pin IC18 is connected to the power supply voltage Vcc through pin P7. Pins IC14–IC17 are coupled to pins P3, P4, P2 and P1, respectively, of the joystick connector. These lines are utilized in connection with a joystick interfacing operation, the details of which are not pertinent to the present invention and will be described generally hereinafter.

Pins P5 and P9 of the joystick connector 34 are connected to the POT Y and POT X input lines 60 and 38. Pin IC12 of interface chip 30 is coupled to the POT Y line through a diode 40, and pin IC13 of interface chip 30 is connected to the POT X line via a direct connection to pin P9 of joystick connector 34.

An oscillator 42 is connected between pins IC7 and IC8 of the interface chip 30 and operates to supply a source of clock signals to provide local timing control. The oscillator circuit includes a crystal 43, capacitors 44 and 46 and a resistor 48. Pin IC9 of interface chip 30 is connected to a source of ground potential, and pins IC10 and IC11 are reset and test lines, respectively, not pertinent to the present invention.

Pin IC6 of interface chip 30 receives a sync signal which is generated by edge detecting circuit 50 including a transistor 52, resistor 54 and diodes 56 and 58. This edge detecting circuit is connected to pin P5 of the SID plug via a line 60 and diode 62. As previously mentioned, pin P5 of joystick connector 34 is connected to detect the level shifts generated on the POT Y line from the SID chip, indicative of the normal potentiometer position readout cycle performed by the SID chip, and to transmit a sync signal which is supplied to the interface chip 30 for internal timing purposes to be described hereinafter.

Figure 3:
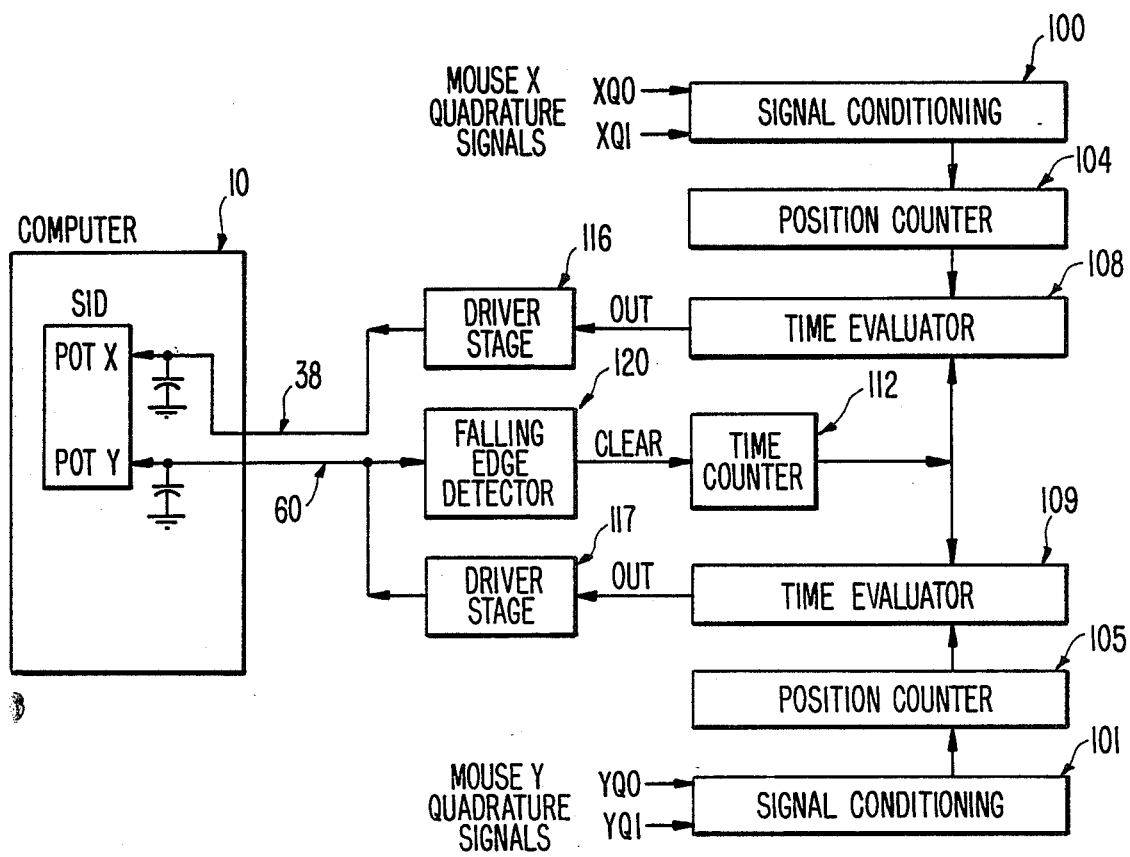
FIG. 3 is a block diagram showing the major control functions performed by the integrated circuit chip 30 employed with the circuit of FIG. 2.

FIG. 3 shows in schematic block diagram form the major functions of the circuits within interface chip 30. Signal conditioning circuits 100 and 101 receive the quadrature signals XQ0, XQ1, YQ0, and YQ1 from the track ball motion detector circuit 32 in the mouse. The signal conditioning circuits 100 and 101 phase-compare the quadrature signals to detect the direction of mouse movement and produce a directional signal output in response thereto. The signal conditioning circuits also generate a single pulse train duplicating the changes of state of the quadrature signals and hence representing the distance of mouse travel.

The outputs of the signal conditioning circuits 100 and 101 are fed to an X position counter 104 and a Y position counter 105, respectively. Each pulse produced by the signal conditioning circuits advances the position counter to which it is fed. Each counter may be, for example, a 6 bit binary counter, connected to cycle up or down, depending upon the sign of the mouse direction signal produced by the signal conditioning circuits. Each counter 104 and 105 is connected to roll over at the end of its count cycle, i.e., from its high count value to zero or from zero to its high count value depending upon whether it is counting up or down. This results in a count value MODULO sixty four.

A time counter circuit 112 is cleared by the positive-going edge of the sync signal from edge detector 120 at the beginning of each read-out cycle. Counter 112 is driven by the clock circuit 42 and feeds a sequence of count signals to a pair of time evaluator circuits 108 and 109 which operate as equality detector circuits. Circuit 108 compares the count in X position counter 104 with the count signals from time counter 112 and generates an output to driver stage 116 when a match is detected. Counter 112 cycles in sync with the counter in the SID chip which is used to read-out the capacitor charge interval in the normal potentiometer read-out cycle. Time evaluator circuit 109 performs the same function as circuit 108 for the Y position counter 105 and feeds an output to driver stage 117 when match is detected between the output of time counter 112 and the Y position count value.

Driver stage 116 generates a positive going level shift on the POT X line 38 and driver stage 117 generates a positive going level shift on the POT Y line 36, both of which are connected to the SID chip. The signal transitions generated by circuits 116 and 117 are interpreted by the SID chip in the same manner as the signals which are produced during a potentiometer read-out operation when the capacitor charging networks reach their threshold voltage level. When the signal transitions on the POT X and Y lines are detected at the SID chip, the interval counter is latched into a register nominally in the system memory map which represents the value contained in the X position counter 104 for the POT X line and the value contained in the Y position counter 105 for the POT Y line.

Software contained within the system interprets each new position count which is read into the memory map by comparing it against the previous count of value, thereby providing the system with an indication of the direction and amount of mouse movement occurring since the preceding read out cycle. This value is converted to cursor position information which is then used to control the position in which the cursor is displayed on the CRT screen such that the cursor position tracks movement of the mouse.

Figure 4:
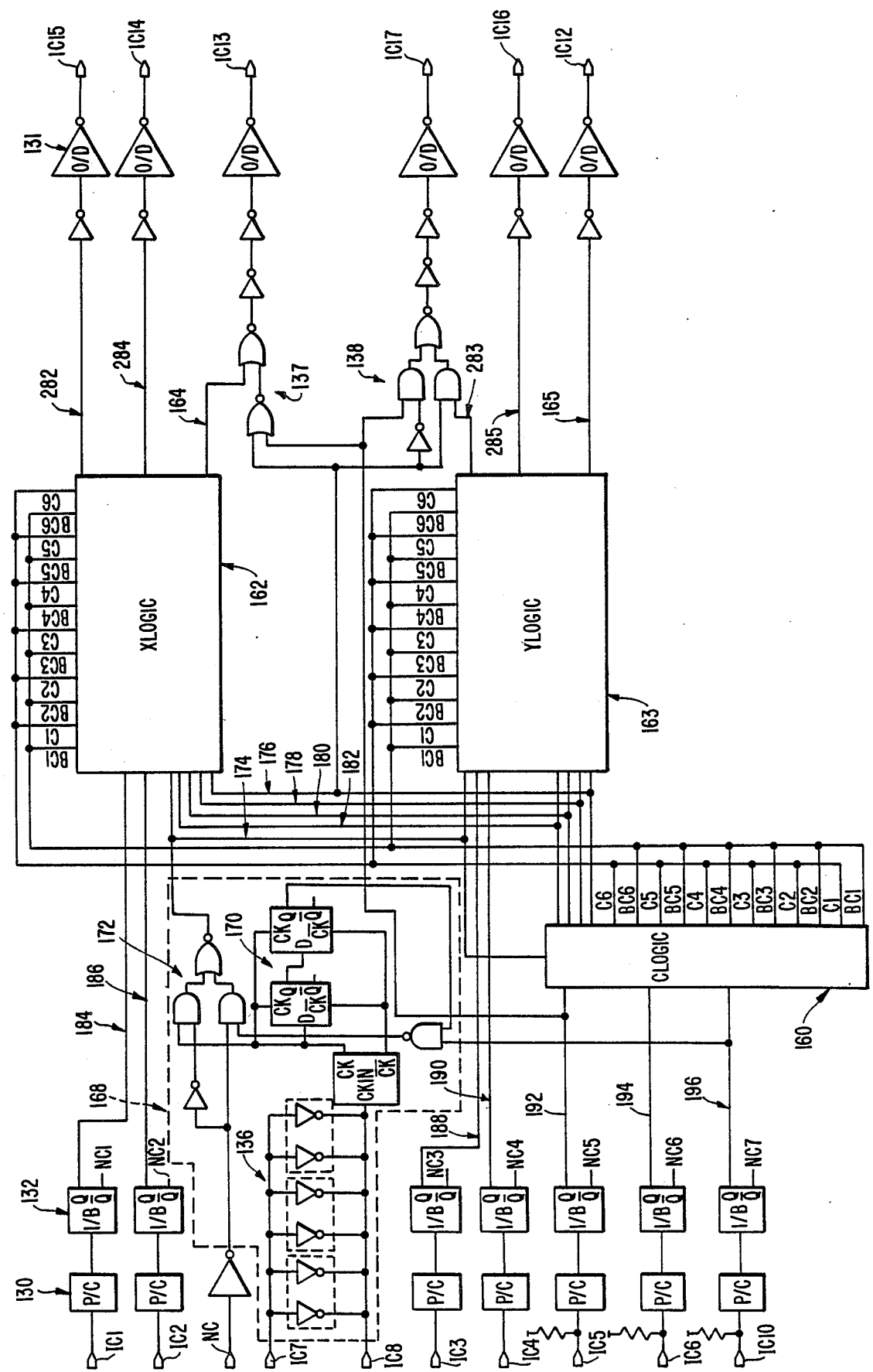
FIG. 4 is an electrical schematic diagram showing the internal structure of the integrated circuit 30 employed with the circuit of FIG. 2.

FIG. 4 shows the major internal circuits of integrated circuit 30 of the first preferred embodiment. Circuit element 130 marked "P/C" is a protection circuit, as are other elements of FIG. 4 marked "P/C." Circuit element 132 marked "I/B" is an input buffer, as are other elements of FIG. 4 marked "I/B." Circuit element 134 marked "O/D" is an output driver as are other elements of FIG. 4 marked "O/D." Crystal oscillator 42 of FIG. 2 is connected to circuit 30 by pins IC7 and IC8. Inverters 136 provide gain to drive the external crystal oscillator. The master clock oscillator and divide down circuit 168 of FIG. 4 divides the crystal oscillator signal by four using counters 170 and provides a nominal 1 MHz clock signal through gate circuit 172 to the rest of integrated circuit 30 via line 174. The reset signal of line 196 is connected to counters 170 to allow the divide by four counter to be cleared. Gates 137 pass signals from right button 68 of FIG. 2 to XPOT pin IC13 when circuit 30 is operating in the joystick mode and pass XPOT signals to pin IC13 when circuit 30 is operating in the proportional mode. Gates 138 of FIG. 4 pass signals from right button 68 of FIG. 2 to the joystick up pin, IC17 of circuit 30, when in the proportional mode, and pass joystick up signals to pin IC17 when circuit 30 is operating in the joystick mode. The contents and functions of CLOGIC Box 160, XLOGIC box 162, and YLOGIC box 163 are discussed in greater detail hereinafter in association with FIGS. 5 through 8.

Figure 5:
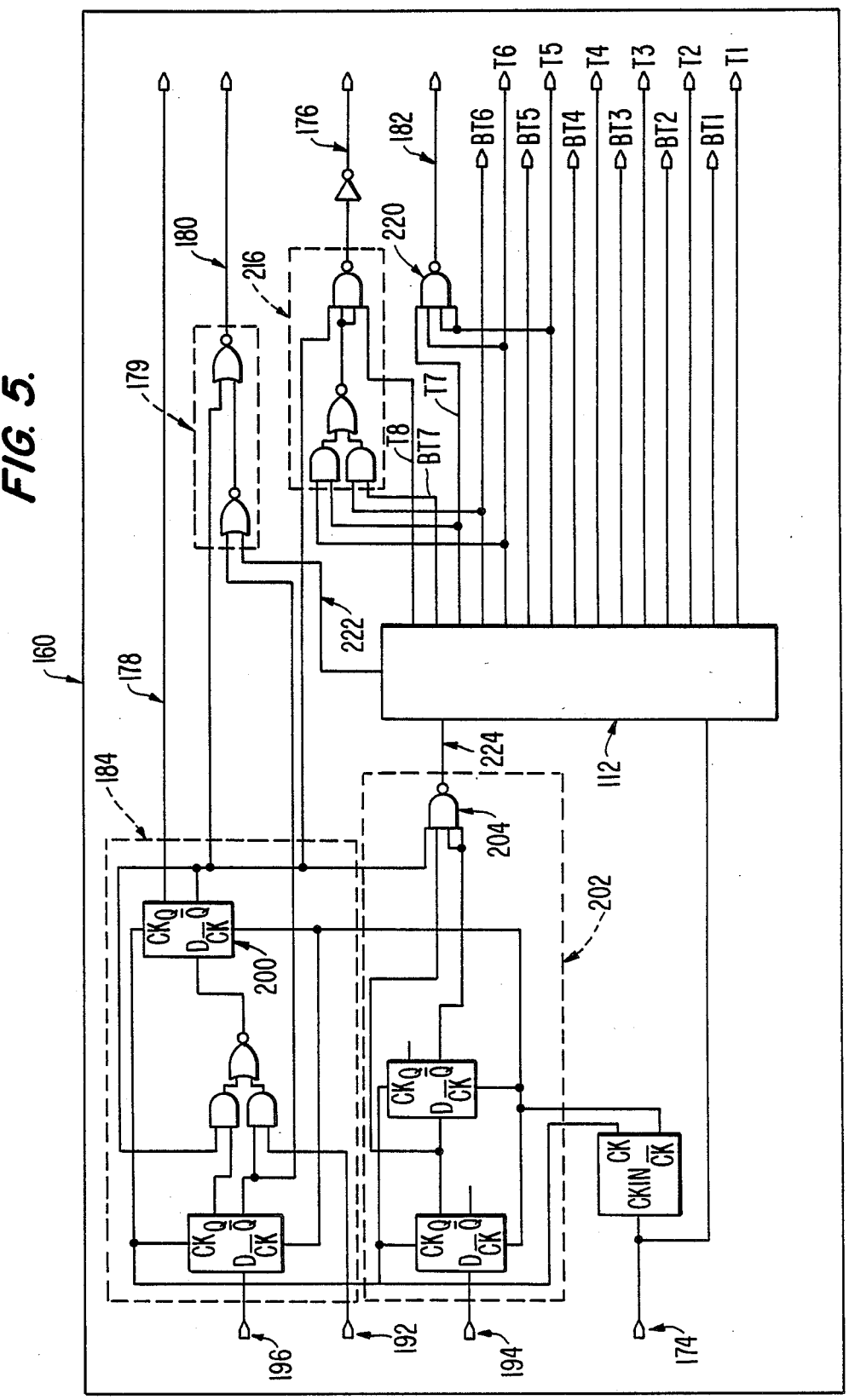
FIG. 5 is an electrical schematic diagram showing the structure of CLOGIC block 160 of FIG. 4.

FIG. 5 shows CLOGIC box 160 of FIG. 4 in greater detail. Integrated circuit 30 has a proportional mode and a joystick mode of operation. Reset and mode circuit 185 synchronizes external reset signals with the internal clock and sets the operating mode of integrated circuit 30 by the position of right button 68 of FIG. 2 while a reset signal is being received by circuit 185. Digital flip-flop 200 latches the mode when the reset input signal on line 196 goes from low to high. When power is applied to the chip, the reset input is held low for a short time by capacitor 70 of FIG. 2 which eventually charges up to allow reset line 196 to go high. When mode line 178 is high, integrated circuit 30 is configured to be in the proportional mode. When line 178 is low, integrated circuit 30 is configured to be in the joystick mode. Sync detect circuit 202 extracts the edge of the externally generated signal of circuit 50 of FIG. 2 that responds to the grounding of POT line 60 by the SID circuit. The two digital flip-flops of circuit 202 store the old value and new value of the signal on line 194 and provide a single clock pulse clear signal through gate 204 to 9 bit time counter 112 when the signal on line 194 goes from low to high and circuit 30 is operating in the proportional mode. The clear signal on line 224 is inhibited by NAND gate 204 when circuit 30 is operating in the joystick mode.

Figure 6:
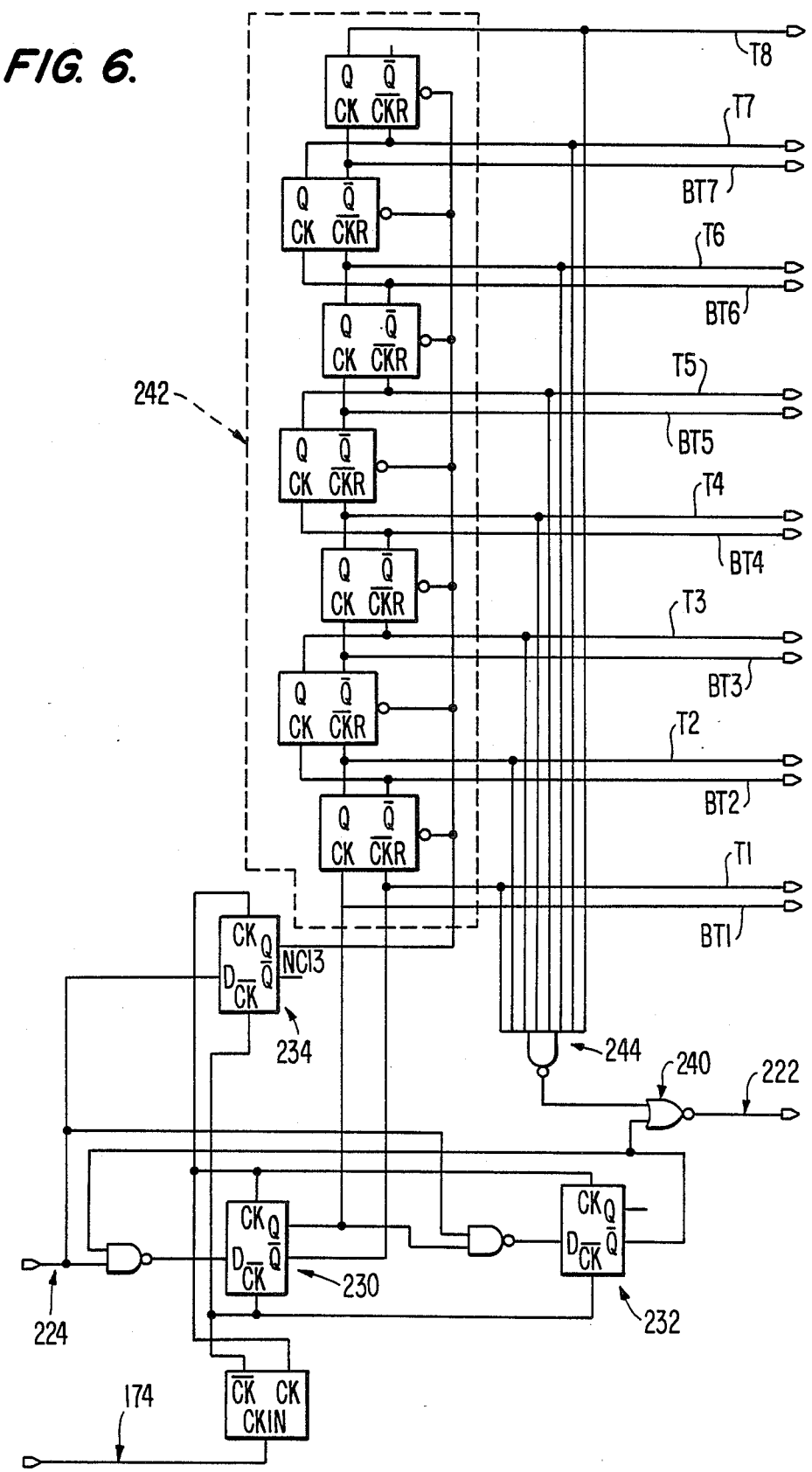
FIG. 6 is an electrical schematic diagram showing the structure of 9 bit counter 112 of FIG. 5.

FIG. 6 shows 9 bit time counter 112 in greater detail. Counter 112 consists of two digital flip-flops 230, 232 configured as a ring counter to generate the lower two time count bits and seven ripple counter digital flip-flop stages 242 that count every 2 usec. Ripple counter 242 and ring counter 230, 232 supply signals T1-T8 to NAND gate 244 which sets a carry output on line 222 whenever the count is all ones, every 512 usec. NOR gate 240 takes into account the lowest order bit to ensure that the carry signal is one clock tick long. In joystick mode, counter 112 is free running, and the only relevant output is the carry signal of one clock tick duration which occurs every 512 usec. on line 222. In proportional mode, counter 112 is cleared every relevant sync cycle by the clear signal on line 224 from NAND gate 204 of FIG. 5. Flip-flop 234 of FIG. 6 ensures that the clear signal is synchronous with the internal clock. Time counter 112 therefore indicates the elapsed time since the last sync transition. Count outputs T1-T6 and BT1-BT6 provide a time count input to equality detector 108, 109 of FIG. 7 that functions as a time evaluator, to be discussed hereinafter. Count outputs T5-T7 are applied to gate 220 of FIG. 5 to provide a CLEAR signal to line 182 for the last 32 counts of each 512 count cycle. Gates 216 of FIG. 5 assert a HOLD signal on line 176 when T6 is not equal to T7 and T8 is set and circuit 30 is in the proportional mode. Therefore the HOLD signal is asserted from time=320 to time=448 usec. The CARRY signal on line 222 is asserted on line 180 as a JTIC signal of one clock tick duration by gates 179 when circuit 30 is operating in the joystick mode.

Figure 7:
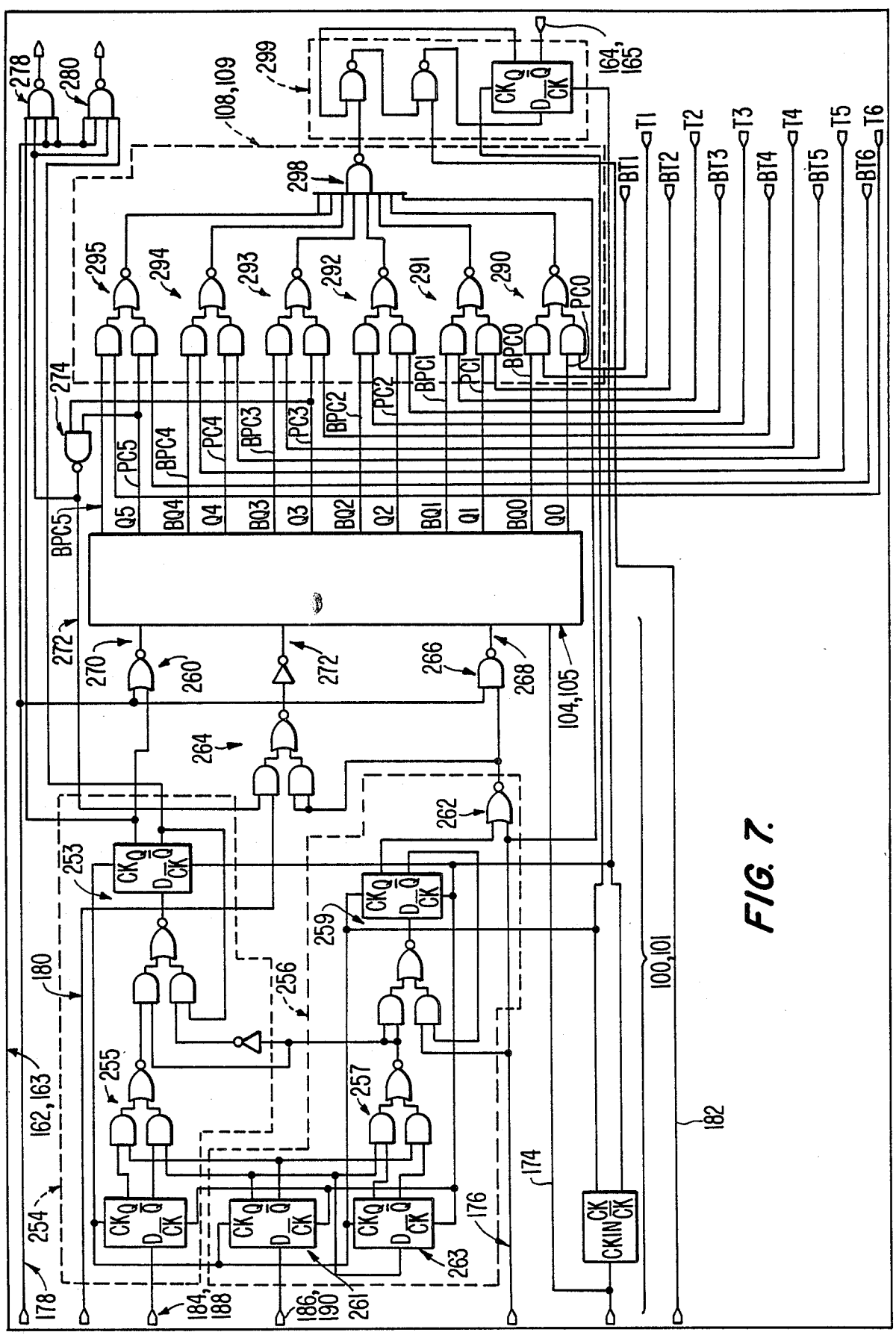
FIG. 7 is an electrical schematic diagram showing the structure of Y LOGIC block 163 and X LOGIC block 162 of FIG. 4.

FIG. 7 shows YLOGIC and XLOGIC circuits 162, 163 of FIG. 4, which are identical to each other, in greater detail. XQUAD and YQUAD signal conditioners 100, 101 of FIG. 7 take quadrature input signals 184, 188 and 186, 190 from mouse optics circuit 32 of FIG. 2, via pins IC1, IC2, IC3, and IC4, and a HOLD signal on line 176 as inputs. Gates 254 provide a direction signal in response to XQ0 and YQ0 signals, and gates 256 provide a motion signal in response to XQ1 and YQ1 signals. In the joystick mode, flip-flops 261 and 263 store the current and past values of the values of lines 186, 190. Gates 255 determine the direction of mouse motion. Gates 257 determine when the mouse has moved and assert a movement signal which is latched by gates 259 and is used by gates 253 to latch the direction signal from gates 255. Without a movement signal the direction signal is ignored by gates 253. In joystick mode, HOLD is not asserted, therefore gates 259, 262, and 266 pass a movement signal which clears 6 bit position counter 104, 105 whenever mouse movement is detected. When the output of 6 bit position counter 104, 105 is less than 40, as signaled by NAND gate 274, and a JTIC signal occurs on line 180 (every 512 usec.) the 6 bit position counter is enabled by a signal from gates 264 on line 272 for one clock tick and the count increases by one. The MODE signal to gate 260 suppresses the down signal on line 270 therefore the position count is always increasing in the joystick mode. While the position count is less than 40, depending on the direction signal, NAND gate 278 or 280 is asserting the appropriate joystick up or right, down or left line. When the count reaches 40, which is equal to 40×512 usec., or roughly 20 msec., NAND gate 274 shuts off the count enable signal on line 272 and shuts off output from whichever of NAND gates 278 or 280 was asserting a joystick signal. No joystick movement signal is asserted until mouse movement is detected, whereupon 6 bit position counter 104, 105 is cleared by the movement signal on line 268. If the mouse continues to move, the position counter continues to be cleared and remain low until the mouse stops, therefore the joystick outputs act as if they were being driven by retriggerable monostable multivibrators.

In the proportional mode, mouse movement is latched by gates 259 and mouse direction is latched by gates 253 as described for the joystick mode. The MODE signal is always low in this mode, therefore 6 bit position counter 104, 105 is never cleared by gate 266. Direction signals on line 270 are not inhibited by the MODE signal, therefore the counts may be either increasing or decreasing depending on the direction signal from gates 253. Each time mouse movement is detected, gates 264 enable 6 bit position counter 104, 105 for one clock tick unless HOLD is asserted, and therefore the position count is proportional to the distance moved by the mouse. HOLD is asserted for 128 usec. out of each 512 usec. during the time period from 320 usec to 448 usec. as determined by gates 216 of FIG. 5. This is the time period during which POT line output is to be generated. When HOLD is asserted, movement is stored in gates 259 until HOLD is no longer asserted. Gates 290-295 of equality detector 108, 109 compare the position count output on lines PC0-PC5 and BPC0-BPC5 of 6 bit position counter 104, 105 to the time count output of 9 bit time counter 112 of FIG. 5 on lines T1-T6 and BT1-BT6. The HOLD signal inhibits motion signals from enabling the position count during the time period while the time evaluators 108, 109 are comparing time and position counts but when HOLD is no longer asserted, the inhibited motion signals are asserted for one clock tick. If 6 bit position counter 104, 105 is counting down while 9 bit time counter 112 is counting up, the counts may sweep past each other without an equality being detected. Freezing the 6 bit position counter ensures a match because the 6 bit position counter can't count down past the 9 bit time counter as the 9 bit time counter is counting up. When an equality between time and position counts is detected and HOLD is asserted, NAND gate 298 goes low and gates 299 latch an output signal on POT lines 164, 165 until a CLEAR signal is received on line 182, whereupon the POT lines are driven low 32 usec. prior to the next sync cycle. In this embodiment, equality detector 108, 109 is wired to assert lines 164, 165 at times and positions according to the following table:

TABLE 1

| Position Count | Time at which Lines 164, 165 are asserted (usec. after start of sync cycle) |
|---|---|
| 0 | 384 |
| 16 | 418 |
| 31 | 448 |
| 32 | 320 |
| 48 | 352 |
| 64 | 384 |

The signal asserted on pins IC12 and IC13 of integrated circuit 30 of FIG. 2 will have a maximum time delay of 448 usec. following the beginning of a sync cycle when position count is 31. The time delay then jumps to 320 usec. when position count exceeds 31 and then increases by 2 usec. for every unit change in the position count. If position count decreases below 32 the signal asserted on pins P12 and P13 shifts from a time delay of 20 usec. to a time delay of 448 usec.

Figure 8:
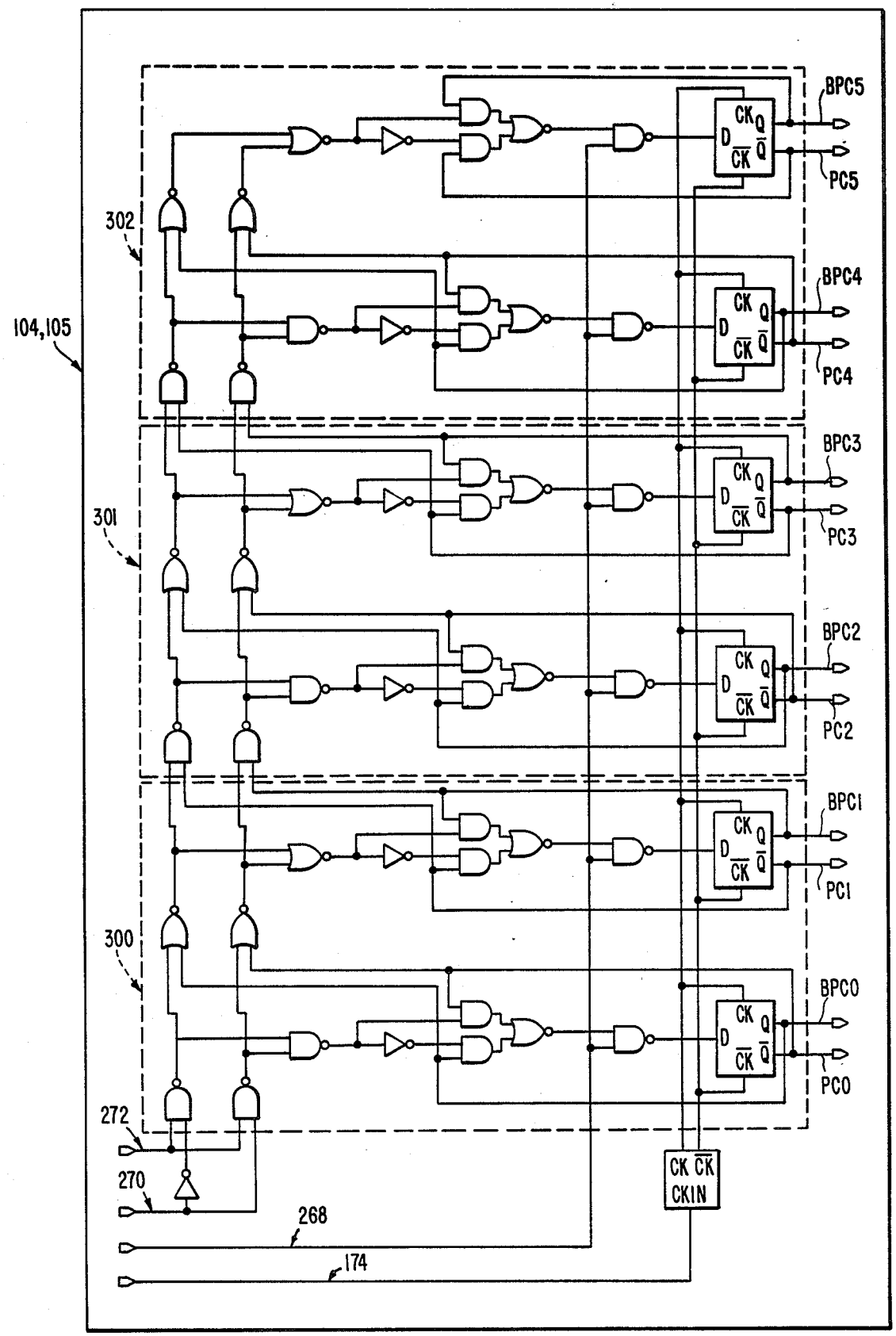
FIG. 8 is an electrical schematic diagram showing the structure of the 6 bit counter 104, 105 of FIG. 7.

Six bit position counters 104, 105, shown in greater detail in FIG. 8, consist of three two bit up-down counter cells 300-302. The counters will only count when the appropriate direction signal is asserted on line 270, a move signal is asserted on count enable line 272, and a clock tick occurs on line 174.

Figure 9A:
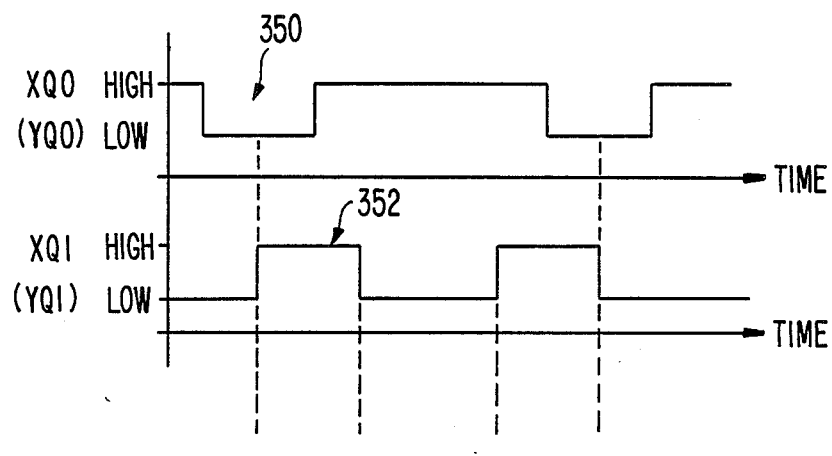
FIG. 9a is a schematic waveform diagram illustrating typical X and Y quadrature signals supplied by the mouse optics motion sensing mechanism.

FIG. 9a shows the quadrature input signals, XQ0, XQ1, YQ0, and YQ1, generated by the mouse device optics. Mouse movement is defined as when signals XQ1 and YQ1 change state from a low to a high or a high to a low value. The sign of mouse movement in orthogonal X and Y directions is indicated by the phase of XQ0 with respect to XQ1 and by the phase of YQ0 with respect to YQ1. Interface circuit 30 looks at XQ0 and YQ0 to determine direction only when the mouse is moving, that is, only when XQ1 or YQ1 are changing state. The mechanics of the mouse optics therefore restrict all possible phase comparisons to those presented in Table 2 below. A 0 represents a high state, and a 1 represents a low state. Table 2 applies equally to values of XQ1 and XQ0.

TABLE 2

| YQ1 Transition Values | YQ0 Value During YQ1 Transition | Direction |
|---|---|---|
| From 0 to 1 | 0 | decreasing |
| From 0 to 1 | 1 | increasing |
| From 1 to 0 | 0 | increasing |
| From 1 to 0 | 1 | decreasing |

Figure 9B:
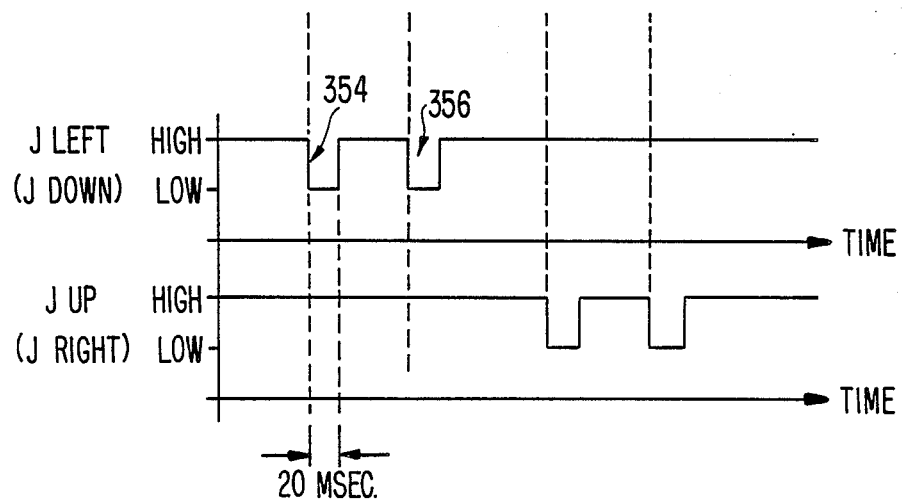
FIG. 9b is a schematic output waveform diagram for the circuit of FIG. 2 operating in the joystick mode.

FIG. 9b shows that in the joystick mode, when the mouse is moved, interface circuit 30 generates approximately 20 millisecond pulses on the respective joystick up, down, left, and right lines. When mouse 14 is moved down (directly toward the user) for example, mouse optics generate Y quadrature signals YQ0 and YQ1, 350 and 352. From Table 1, YQ1 changes state from 1 to 0 while YQ0 is 1, therefore direction is decreasing. In the joystick mode, interface device 30 generates output pulses 354 and 356 at the J Down line, pin IC16. The 20 msec. pulses occur whenever motion is detected. Should the mouse move such that transitions of the YQ1 and XQ1 signals occur at a rate faster than 20 msec., then the appropriate line will remain grounded. In this sense the joystick outputs act as if they are being driven by retriggerable monostable multivibrators. Also, the 20 msec. time period need not be exact. In this embodiment it is specified as 20 msec. ±1 msec. In the proportional, or mouse, mode, interface circuit 30 determines the sign of direction of mouse movement by doing the same phase comparison of the individual signals in each quadrature pair.

Figure 10A:
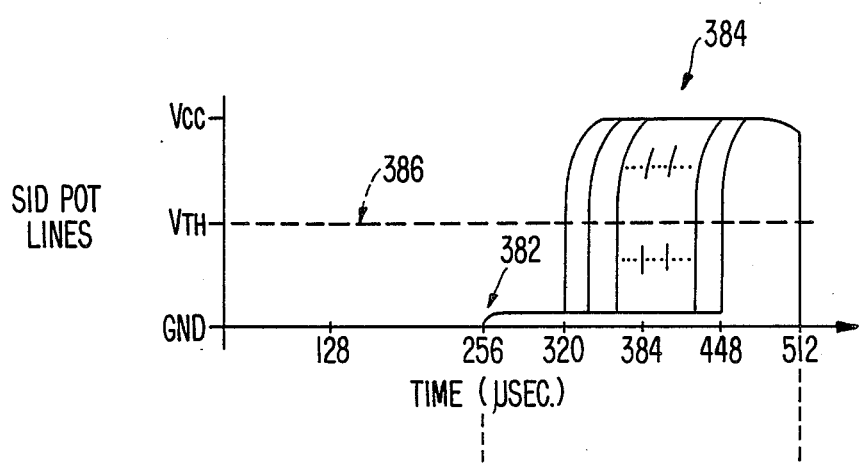
FIG. 10a is a schematic output waveform diagram for the circuit of FIG. 2 operating in the proportional, or mouse, mode.
Figure 10B:
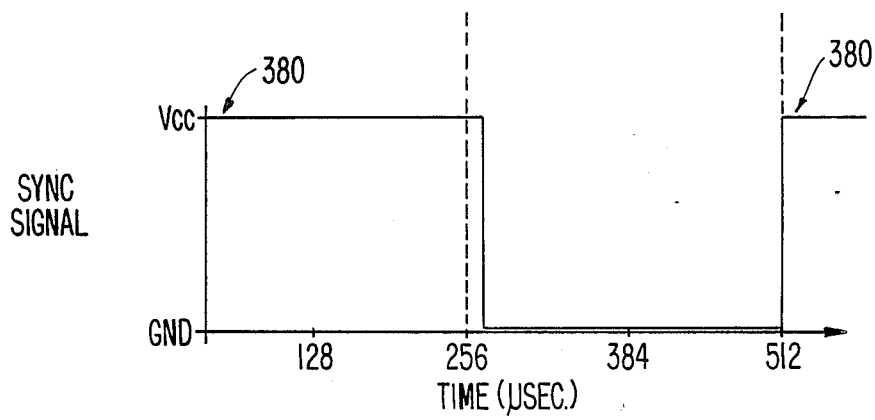
FIG. 10b is a schematic output waveform diagram of the sync signal generated by the circuit of FIG. 2 in response to grounding of the POT lines by the SID chip.

FIG. 10a shows the key timing events occurring on SID POT lines 60 and 38 of FIG. 2 as compared to interface circuit 30 sync signal. The sync signal is derived from the voltages on the SID POT Y line 60. In this embodiment, the SID circuit clamps the SID POT lines to ground voltage at time=0 usec. The sync signal at pin IC6 of interface chip 30 rises to Vcc when the SID voltage on SID POT Y line 60 goes to ground, as shown by point 380 of FIG. 10b. At time=256 usec. the SID circuit stops grounding the POT lines and interface circuit 30 pulls the SID POT lines slightly high through resistors 64 and 66 of FIG. 2, at point 382 of FIG. 10a. Depending on the sign of mouse motion in each orthogonal direction and the distance of mouse movement, interface chip 30 drives the SID POT lines to Vcc at a time delay varying from time=320 usec. to time=448 usec. after the rising edge of the sync signal 380, as shown by the series of curves 384 of FIG. 10a. The actual time delay is a function of mouse position, MODULO sixty four usec. and gives rise to a series of time delays with 2 usec. separation. Interface chip 30 stops driving SID POT lines high at time=480 usec. after the rising edge of the sync signal, which is 32 usec. before the start of the next SID timing cycle. The SID POT lines remain high until being clamped by the SID circuit because of a capacitor within the SID circuit. The conversion cycle is repeated every 512 usec. in this embodiment, but the invention may be practiced with cycle times other than 512 usec. and SID POT line rise times outside the band of 320 to 484 usec.

During each cycle, if the mouse does not move, interface chip 30 continues to drive the SID POT line high at the same time delay. If the mouse moves left, the interface circuit drives SID POT X line 38 of FIG. 2 high at a time closer to 320 usec. as shown in Table 1 hereinabove. When the mouse moves left to a point where the interface chip would need to drive the SID POT X line high at a time less than 320 usec., the time evaluator 108, 109 acts as a MODULO sixty four calculation which jumps the time for driving the line high to 448 usec. and the cycle starts over. When the mouse moves to the right, the time to drive SID POT X line 38 high approaches 448 usec. When the time would exceed 448 usec., the MODULO sixty four calculation causes the time to drive the SID POT X line high to shift to 320 usec. and continue moving toward 448 usec. as the mouse continues to move to the right. This description also applies to SID POT Y line 36 response to mouse movement, except that output is a function of up and down mouse movement rather than left and right mouse movement.

The SID POT line waveform 384 is a pulse-position modulated signal having a positive going transition at a time responsive to mouse position. The SID POT line voltage therefore has the appearance to the SID circuit as being generated by a capacitor charging at a varying rate as a function of a series potentiometer setting. Threshold voltage 386 (Vth) on FIG. 10a is the voltage level at which the SID counter circuit stops counting the charging time following the release of the SID POT lines. Since the mouse circuitry of this invention controls the time at which the voltage exceeds Vth as a function of mouse position, the SID circuit counting time is also a function of mouse position.

Figure 12:
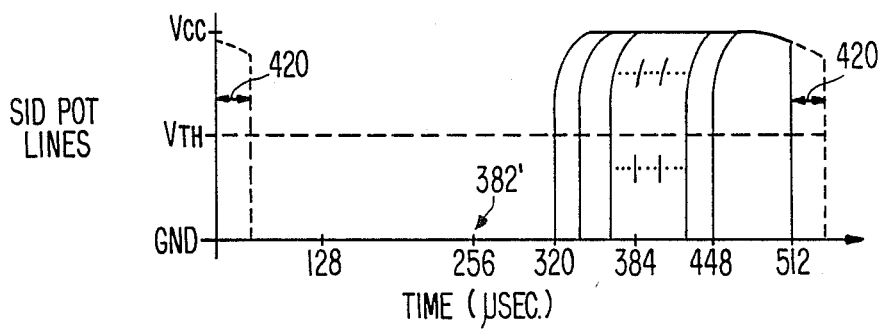
FIG. 12 is a schematic output waveform diagram for the circuit of FIG. 11 operating in the proportional, or mouse, mode.
Figure 11:
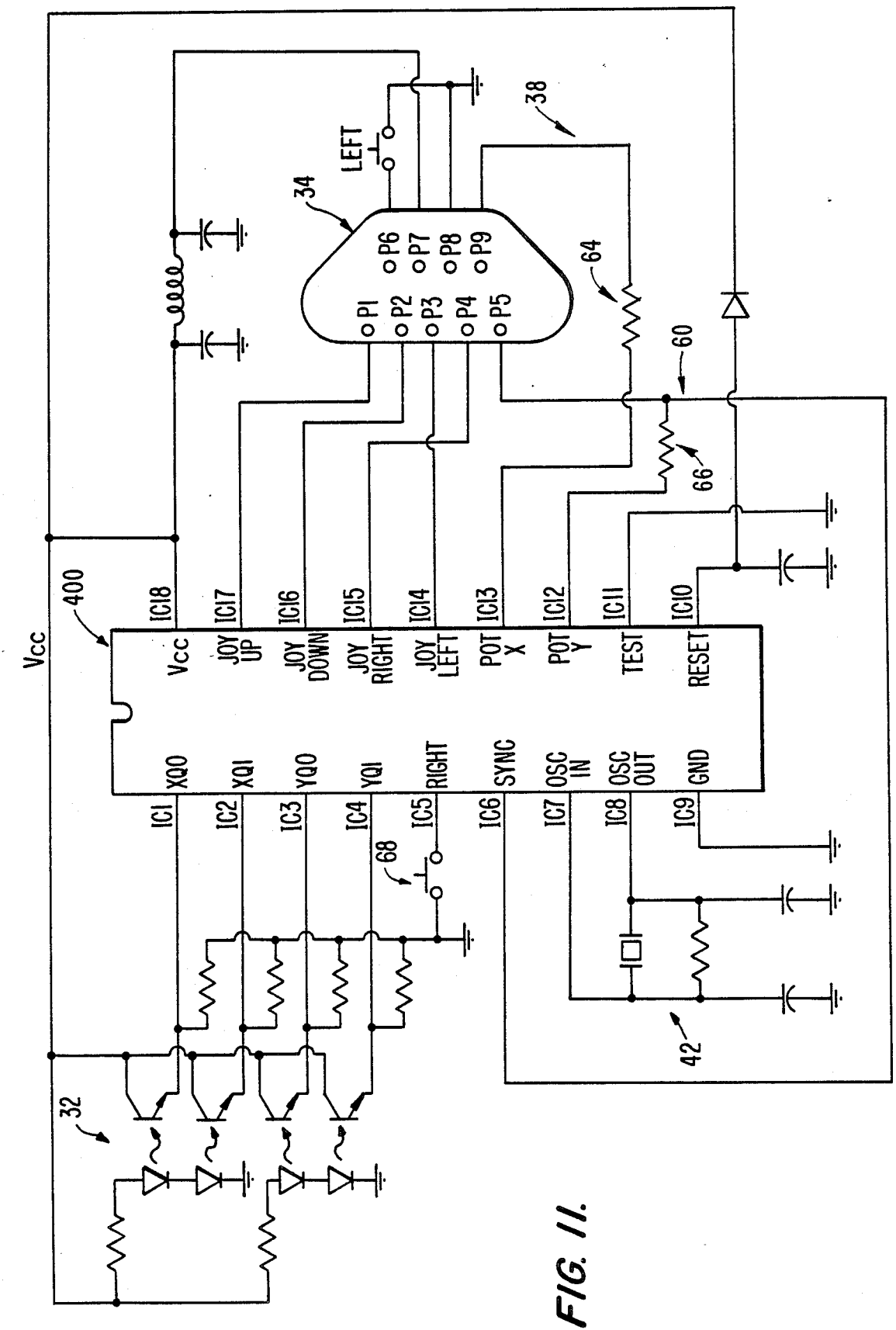
FIG. 11 is an electrical schematic diagram showing a second preferred embodiment of the interface circuit of the invention.

FIG. 11 shows the electrical schematic of a second preferred embodiment of this invention. Elements identical to those in FIG. 2 have the same reference numbers. In this embodiment, POT X line 38 and POT Y line 60 are connected to SID plug 34 through resistors 64 and 66 respectively, and they are not connected to Vcc as they were in the first preferred embodiment. As a result of this difference in the circuit, the SID POT line waveform of FIG. 12 for the second preferred embodiment does not rise slightly above ground at point 382' when the SID circuit releases the POT lines at time=256 usec., add interface chip 400 of FIG. 11 does not release SID POT lines until a few usec. after the SID chip grounds the POT lines at time=512 usec. Resistors 64 and 66 of FIG. 11 prevent conflicts between the SID circuit pulling the POT lines low and interface circuit 400 pulling the POT lines high. These differences between the first and second preferred embodiments have no effect on the detection of mouse position by the SID circuit because the SID counting circuit only detects voltages rising above Vth in the time period from 320 usec. to 448 usec. The differences between the two preferred embodiments do not affect this operation.

FIGS. 13a-13d shows the internal circuit of interface circuit 400 of FIG. 11. Major areas of interface circuit 400 that perform the same functions as those in interface circuit 30 of FIG. 2 are labeled with the same number followed by a prime ('). Circuit elements of interface circuit 400 that are identical to interface circuit 30 are labeled with the same number. The master clock oscillator and divide down circuit 168' of FIG. 13d performs a divide by four operation using flip-flops 170' to provide a source of nominal 1 MHz. signals to the rest of interface circuit 400. Amplifier 136' provides sufficient gain between pins IC7 and IC8 to enable oscillator 42 to oscillate. Multiplexer element 172' performs the same function as gates 172 of FIG. 4, and has one output, a select input, and two data inputs. When select is high, input A is directed to the output. When select is low, input B is directed to the output. The other trapezoidal shaped circuit elements of circuit 400 are also multiplexers, and operate in the same manner. The proportional or joystick operating mode of integrated circuit 400 is latched by gate 185' of FIG. 13a. Sync detect circuit 202' generates a single clock pulse whenever the sync input signal at pin IC6 of integrated circuit 30 transitions from high to low. This differs from the operation of circuit 30 of FIG. 2 which had an external sync detect circuit 50. Edge detecting circuit 50 on FIG. 2 has been removed on the second preferred embodiment and has been replaced with a sync detect circuit 202' within interface circuit 400 that provides a sync signal in response to the SID circuit clamping of SID POT Y line 60. The sync pulse on line 224' is inhibited by NAND gate 204' when the device is in the joystick mode as signalled on line 206'.

Figure 13A:
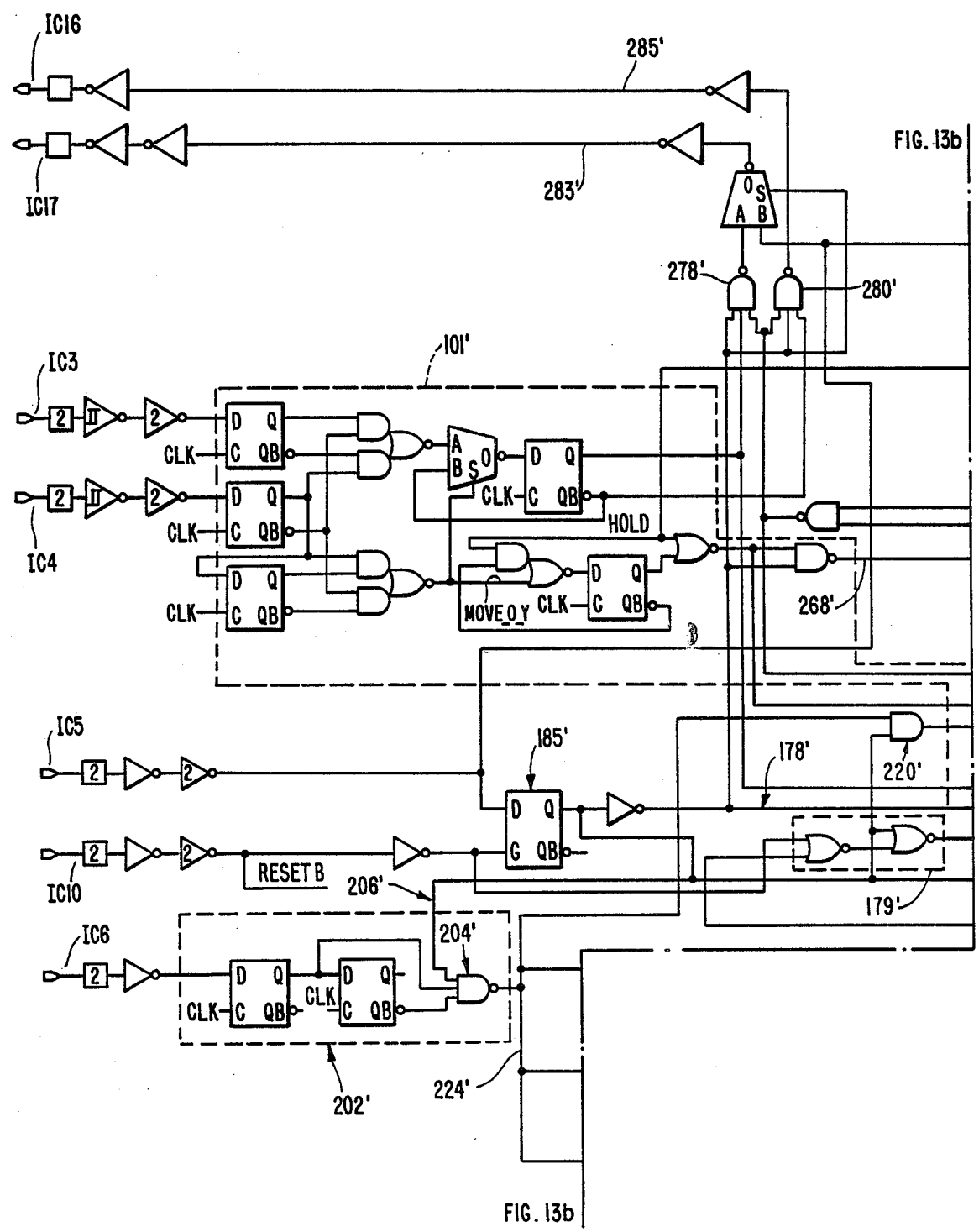
FIG. 13a–13d comprise an electrical schematic diagram showing the internal structure of integrated circuit 400 of FIG. 11 employed with the circuit of FIG. 11.
Figure 13B:
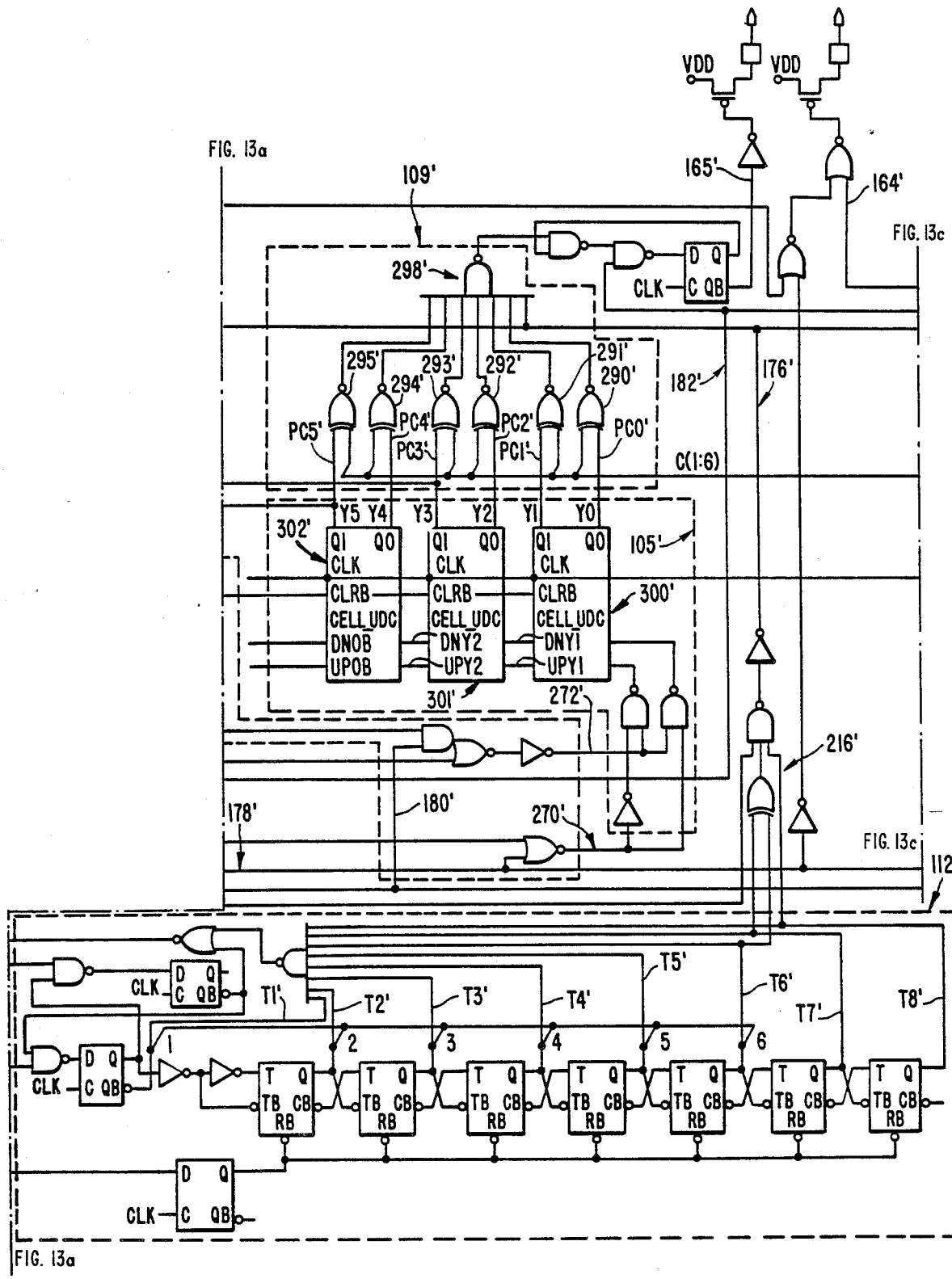

Nine bit time counter 112' of FIG. 13b is similar in structure and operation to time counter 112 of FIG. 6 except that counter 112' does not provide a BT1-BT7 output. Gate 216' provides a HOLD signal to line 176' in the same manner described for gates 216 and line 76 of FIG. 5. MODE line 178', and JTIC line 180', are asserted in the same manner as the respective lines of FIG. 5.

Figure 13C:
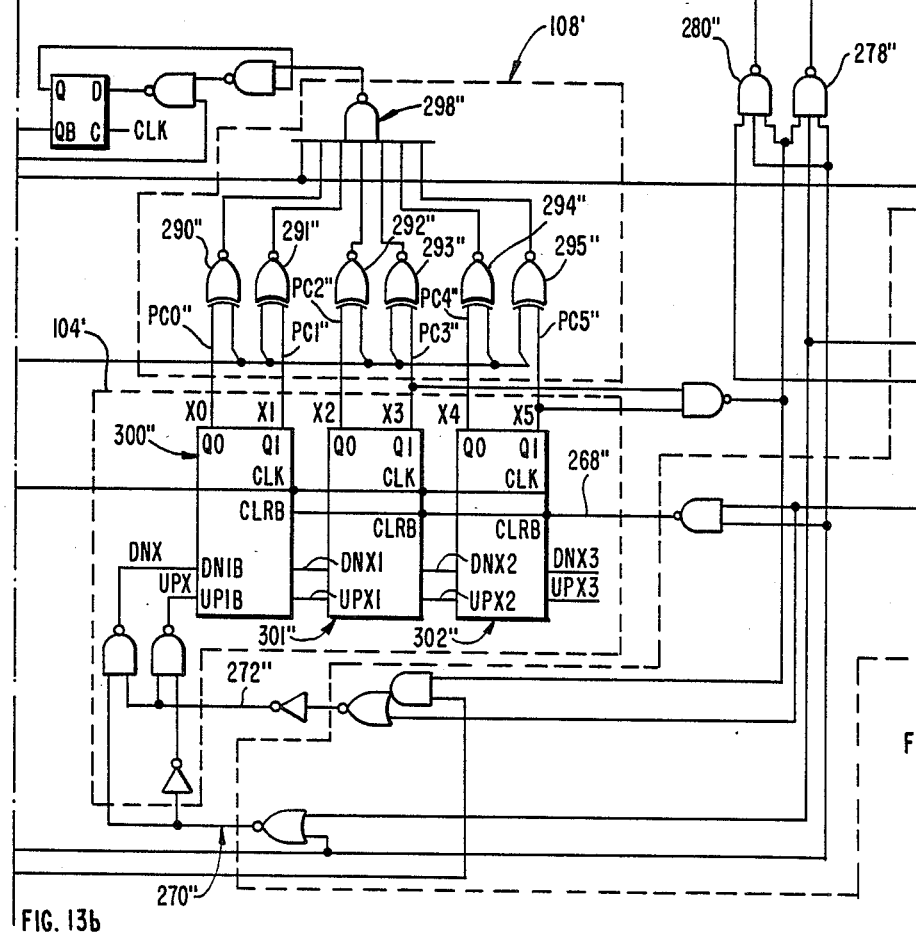
Figure 13D:
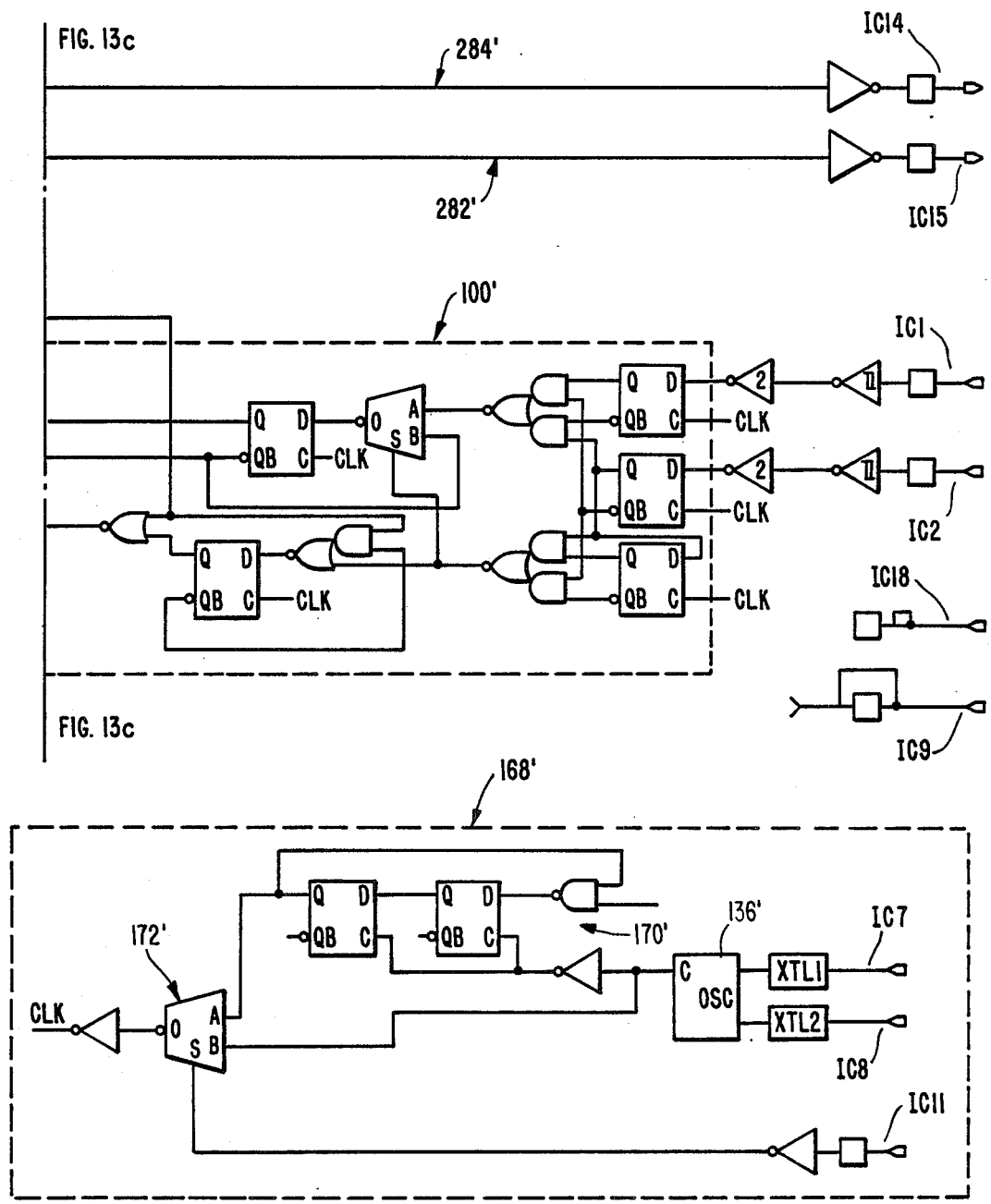

XQUAD and YQUAD signal conditioners 100' of FIG. 13d and 101' of FIG. 13a perform the same functions as circuits 100, 101 of FIG. 7 and assert direction line 270', 270", move line 272', 272", and clear line 268', 268", of FIGS. 13b and 13c in the same manner as lines 270, 272, and 268 of FIG. 7. Six bit position counters 104', 105' of FIGS. 13b and 13c consist of three two bit up-down counter cells 300'-302', 300"-302". The position counters perform in the same manner as position counter 104, 105 of FIG. 8 except that the output consists of signals PC0'-PC5', PC0"-PC5" rather than PC0-PC5 and BPC0-BPC5 as were produced by position counter 104, 105. In the joystick mode, position counters 104', 105' respond to JTIC signals asserted by gates 179' on line 180' of FIG. 13a in the same manner as the corresponding circuits of FIG. 7. Gates 278', 278", 280', 280" of FIGS. 13a and 13c assert the appropriate joystick up, right, down, and left lines 283', 282', 285', and 284' respectively in the same manner as the equivalent circuits of FIG. 7. Equality detectors 108', 109' of FIGS. 13a and 13b function in the same manner as equality detectors 108, 109 of FIG. 7, except that gates 290-295 of FIG. 7 have been replaced by XNOR gates 290'-295', 290"-295". Gates 290'-295', 290"-295" compare position counts on lines PC0'-PC5', PC0"-PC5" with time counts on lines T1'-T6', T1"-T6". NAND gates 298' and 298" cause signals on lines 164', 165' when the counts are appropriate and HOLD is not asserted on line 176'. Gate 220' of FIG. 13b does not assert a CLEAR signal on line 182' of FIG. 13b in the same manner as the equivalent circuit of FIG. 5. Gate 220' asserts a clear signal when the rising sync is asserted on line 224' and circuit 400 is in the proportional mode. As a result, because of gate delay times, POT X and POT Y lines at pins IC13 and IC12 of circuit 400 of FIG. 11 remain asserted for a few usec. after the SID chip has pulled lines 60 and 38 low. Resistors 64 and 66 of FIG. 11 prevent excessive currents during the transition period, 420 of FIG. 12.

Additional advantages and modifications will readily occur to those skilled in the art. The invention in its broader aspects is, therefore, not limited to the specific details, representative apparatus and illustrative examples shown and described. Accordingly, departures may be made from such details without departing from the spirit or scope of applicant's general inventive concept.

What is claimed is:

1. A mouse-type input device for connection to a computer having a timing means for generating a succession of time cycles and a sensing means for sensing the time of occurrence of a predetermined voltage during each of the time cycles, said input device comprising:
   (a) motion sensor means responsive to the travel of said input device operative to generate a succession of electrical signals having characteristics corresponding to the distance and direction of travel of said input device;
   (b) interface means responsive to said succession of electrical signals for generating during each of the succession of time cycles a first pulse of predetermined voltage having a time of occurrence in a respective time cycle corresponding to the characteristics of said electrical signals; and
   (c) coupling means for receiving said succession of time cycles from the computer and for transmitting corresponding ones of said first pulses in succession.

2. A mouse-type computer input device of claim 1 wherein the means of generating a succession of electrical signals includes means for generating a first and second pair of quadrature input signals, each said first and second pair having respective first and second signals, said first pair being responsive to motion of said input device in either a positive or negative x direction on a two dimensional plane, and said second pair being responsive to motion of said input device in either a positive or negative y direction on said two dimensional plane, and said second signal of each of said pairs changing state in response to motion of said input device, and said first signal and said second signal of each of said pairs having a phase responsive to a respective positive or negative direction of movement of said input device on said two dimensional plane.

3. A mouse-type computer input device of claim 2 wherein said interface means includes:
   (a) means for detecting a succession of said first and said second pairs of input signals during each of said time cycles; and
   (b) wherein said means for generating said first pulses includes means for transitioning from a low voltage to a high voltage at a time responsive to both the phase of said first and second pairs of quadrature input signals, and the number of changes of state of said second signals of said first and second pairs.

4. A mouse-type input device of claim 2 wherein said interface means includes:
   (a) signal conditioning means, responsive to the phase and change of state of each of said first and second pairs of input signals, for generating a directional signal and a single pulse train for each of said pairs of input signals; and
   (b) position counting means for counting each pulse of said single pulse train, and counting up or down depending on the sign of said directional signal; and
   (c) time counting means responsive to each of said time cycles for generating a sequence of count signals; and
   (d) time evaluator means for generating a second pulse when the number of said sequence of count signals equals the count from said position counting means during each of said time cycles; and
   (e) driver means responsive to said second pulse for generating a positive going voltage signal.

5. A method for operatively connecting a mouse type input device to a computer having a means for generating a succession of time cycles and a means for sensing the time of occurrence of a predetermined voltage during each of the time cycles, said method comprising:
   (a) generating a succession of electrical signals having characteristics corresponding to the distance and direction of travel of said input device;
   (b) generating a first pulse of predetermined voltage responsive to said succession of electrical signals during each of said succession of time cycles having a time of occurrence in a respective time cycle corresponding to the characteristics of said electrical signals; and
   (c) receiving said succession of time cycles from the computer and transmitting said corresponding ones of said first pulses in succession.

6. The method of claim 5 wherein the method of generating a succession of electrical signals includes generating a first and second pair of quadrature input signals, each said first and second pair having first and second signals, said first pair being responsive to motion of said input device in either a positive or negative x direction on a two dimensional plane, and said second pair being responsive to motion of said input device in either a positive or negative y direction on said two dimensional plane, and said second signal of each of said pairs changing state in response to motion of said input device, and said first signal and said second signal of each of said pairs having a phase responsive to a respective positive or negative direction of movement of said input device on said two dimensional plane, 7. The method of claim 6 wherein said method for generating a succession of electrical signals includes:
    (a) detecting a succession of said first and said second pairs of quadrature input signals during each of said time cycles; and
    (b) wherein said step of generating said first pulses includes a method for transitioning from a low voltage to a high voltage at a time responsive to both the phase of said first and second pairs of quadrature input signals, and the number of changes of state of said second signals of said first and second pairs.

8. The method of claim 6 wherein said method for generating a succession of electrical signals includes:
    (a) generating a directional signal and a single pulse train for each of said pairs of quadrature input signals, responsive to the phase and change of state of each of said first and second pairs of input signals; and
    (b) counting each pulse of said single pulse train, and counting up or down depending on the sign of said directional signal; and
    (c) generating a sequence of count signals responsive to each of said time cycles; and
    (d) generating a second pulse when the number of said sequence of count signals equals the count from said position counting means during each of said time cycles; and
    (e) generating a positive going voltage signal responsive to said second pulse.

* * * * *